(12) United States Patent
Tin

(10) Patent No.: US 7,557,814 B2
(45) Date of Patent: Jul. 7, 2009

(54) CONSTRUCTION AND USE OF A MULTI-SHELLED GAMUT BOUNDARY DESCRIPTOR

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 11/252,541

(22) Filed: Oct. 19, 2005

(65) Prior Publication Data
US 2007/0085855 A1    Apr. 19, 2007

(51) Int. Cl.
*G09G 5/02* (2006.01)
(52) U.S. Cl. .................... 345/590; 382/167
(58) Field of Classification Search .............. 345/590
See application file for complete search history.

(56) References Cited

U.S. PATENT DOCUMENTS

| | | | | |
|---|---|---|---|---|
| 5,721,572 A * | 2/1998 | Wan et al. ............... | 345/590 |
| 5,949,967 A * | 9/1999 | Spaulding et al. ......... | 358/1.9 |
| 6,720,973 B2 * | 4/2004 | Butler .................... | 345/604 |
| 6,724,500 B1 * | 4/2004 | Hains et al. .............. | 358/1.9 |
| 6,850,342 B2 | 2/2005 | Woolfe et al. ............ | 358/1.9 |
| 6,961,461 B2 * | 11/2005 | MacKinnon et al. ....... | 382/164 |
| 6,995,865 B1 * | 2/2006 | Motomura ............... | 358/1.9 |
| 7,116,441 B1 * | 10/2006 | Matsuoka ................ | 358/1.9 |
| 2002/0122208 A1 * | 9/2002 | Siegeritz ................. | 358/2.1 |
| 2003/0189716 A1 * | 10/2003 | Tsuji et al. ............... | 358/1.9 |
| 2004/0070736 A1 * | 4/2004 | Roddy et al. ............. | 353/31 |
| 2004/0100643 A1 * | 5/2004 | Jones et al. .............. | 358/1.9 |
| 2005/0047648 A1 | 3/2005 | Newman et al. .......... | 386/162 |
| 2005/0047654 A1 | 3/2005 | Newman et al. .......... | 382/167 |
| 2007/0052986 A1 * | 3/2007 | Spaulding et al. ......... | 358/1.9 |

OTHER PUBLICATIONS

G, Braun, et al., "Image Lightness Rescaling Using Sigmoidal Contrast Enhancement Functions", Journal of Electronic Imaging, vol. 8, (1999).

J. Morovic, et al., "Gamut Mapping Algorithms Based on Psychophysical Experiment", Proceedings of the 5th IS&T/SID Color Imaging Conference, 1997 (pp. 44-49).

(Continued)

*Primary Examiner*—Xiao M Wu
*Assistant Examiner*—Maurice McDowell, Jr.
(74) *Attorney, Agent, or Firm*—Fitzpatrick, Cella, Harper & Scinto

(57) ABSTRACT

Construction and use of an inner shell for a multi-shelled gamut boundary descriptor (GBD) for a source device based on a predesignated outer shell for the source device, for use in gamut-mapping from the gamut of the source device to a gamut of a destination device. An inner shell and outer shell for the destination device is accessed, and a determination is made of an amount by which the inner shell of the destination device is smaller than the outer shell of the destination device. The inner shell of the source device is thereafter constructed by reducing the outer shell of the source device based at least in part on the amount by which the inner shell of the destination device is smaller than the outer shell thereof. The construction can be performed on the entirety of the GBD or only on parts thereof, such as a hue slice.

15 Claims, 13 Drawing Sheets

OTHER PUBLICATIONS

J. Morovic, et al., "The Fundamentals of Gamut Mapping: A Survey" Journal of Imaging Science and Technology, Jul. 2000.

CIE Division 8: TC8-03—Gamut Mapping <http://www.colour.org/tc8-03/>, visited Sep. 2, 2005.

CIE Division 8: TC8-03—Public Gamut Mapping Algorithms Source Code <http://www.colour.org/tc8-03/pgma.html>, visited Sep. 2, 2005 (on CD).

G. Braun, et al., "General-Purpose Gamut Mapping Algorithms: Evaluation of Contrast-Preserving Rescaling Functions for Color Gamut Mapping", pp. 1-32, 1999.

T. Cholewo, et al., "Gamut Boundary Determination Using Alpha-Shapes", <ci.uofl.edu/tom/papers/Cholewo99cic-titled.pdf>, Sep. 26, 2005.

* cited by examiner

CONSTRUCTION AND USE OF A MULTI-SHELLED GAMUT BOUNDARY DESCRIPTOR

BACKGROUND OF THE INVENTION

1. Field of the Invention

The present invention is directed to construction and use of a multi-shelled gamut boundary descriptor for a device, particularly a source device, for which a gamut boundary descriptor does not already contain a sufficient number of shells.

2. Description of the Related Art

The need for gamut mapping arises during reproduction of colors rendered on one device and/or medium onto another device and/or medium. The difference in gamuts between these devices and media requires re-mapping of colors such that colors in the source gamut are mapped to colors within the destination gamut.

In gamut-mapping where high dynamic range (HDR) imagery and HDR devices are involved, it has been found that a gamut mapping algorithm (GMA) that employs a multi-shelled gamut boundary descriptor (GBD) often yields improved gamut-mapped results and increased color fidelity. See U.S. Patent Application Publication 2005/0047648, "Color Descriptor Data Structure" by Newman, et al., and U.S. Patent Application Publication 2005/0047654 "Gamut Mapping Between Multiple Boundary Regions" by Newman, et al. These published applications are incorporated herein by reference.

Typically, two shells are employed: an inner "reference" shell and an outer "plausible" shell. In general, gamut mapping using such a two-shelled GBD acts to map colors for the inner reference shell of the source device to the inner reference shell of the destination device, and to map colors for the outer plausible shell of the source device to the outer plausible shell for the destination device.

To benefit from the advantageous effect of multi-shelled gamut mapping, both the source device and the destination device must have a multi-shelled GBD. However, there are quite a few devices, such as legacy devices, for which the GBD has an insufficient number of shells, such as devices that have only a singly-shelled GBD. In recognition of this fact, the inventor herein has recently filed a patent application that describes construction of multiply-shelled GBDs for devices that have an insufficiently-shelled GBD, based on the known shells of such devices. See U.S. application Ser. No. 11/220,751, entitled "Perceptual Gamut Mapping With Multiple Gamut Shells" by Siu Kei Tin. The contents of the aforesaid application Ser. No. 11/220,751 are incorporated herein by reference.

SUMMARY OF THE INVENTION

It is an object of the invention to provide an improved construction of a multi-shelled GBD based on a given GBD that does not already contain a sufficient number of shells. In particular, the construction is well-suited for source devices, since it tends to utilize available gamut of the destination side which otherwise might be underutilized in the mapping from reference shell of the source to reference shell of the destination and the mapping of plausible shell of the source to plausible shell of the destination.

According to the invention herein an inner shell for a multi-shelled gamut-boundary descriptor for a source device is constructed based on an outer shell of the source device. An inner shell and an outer shell of a multi-shelled gamut boundary descriptor for a destination device is accessed, and a determination is made of the amount by which the inner shell of the destination device is smaller than the outer shell of the destination device. The inner shell of the source device is constructed by reducing the outer shell of the source device based at least in part on the amount by which the inner shell of the destination device is smaller than the outer shell of the destination device.

In making the determination of the amount by which the inner shell of the destination device is smaller than the outer shell thereof, a ratio of the inner shell of the destination device may be calculated relative to the outer shell thereof. In this case, the inner shell of the source device is constructed by reducing the outer shell of the source device based at least in part on this ratio. Moreover, the ratio may be calculated at multiple locations throughout the extent of the gamut boundary descriptor of the destination device, with the ratio being applied at each corresponding location for calculation of the inner shell of the source device.

In its preferred form, and particularly when applied to gamut mapping according to an SGCK algorithm ("Sigmoidal Gaussian Cusp Knee" algorithm), such as in the aforementioned application Ser. No. 11/220,751, it is ordinarily not necessary to construct the entire inner shell for the source device. Rather, it is preferable to construct only a part of the inner shell, such as a hue slice. In this instance, it is also preferable to identify a point on the neutral axis whose lightness is the same as the cusp of the outer plausible shell of the destination device, and to determine the amount by which the inner shell of the destination device is smaller than the outer shell of the destination device for each ray emanating from the identified point. The determined amount may be a ratio as described above, and the amount is applied in construction of the inner shell at each corresponding ray for the outer shell of the source device.

The invention also pertains to use of a multi-shelled gamut boundary descriptor constructed according to the techniques defined herein. The constructed gamut boundary descriptor is well-suited for gamut mapping according to a SGCK algorithm ("Sigmoidal Gaussian Cusp Knee" algorithm) as described in the aforementioned application Ser. No. 11/220,751, but it should be understood that the multi-shelled GBD constructed herein is also usable in other gamut mapping algorithms that rely on multi-shelled GBDs.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
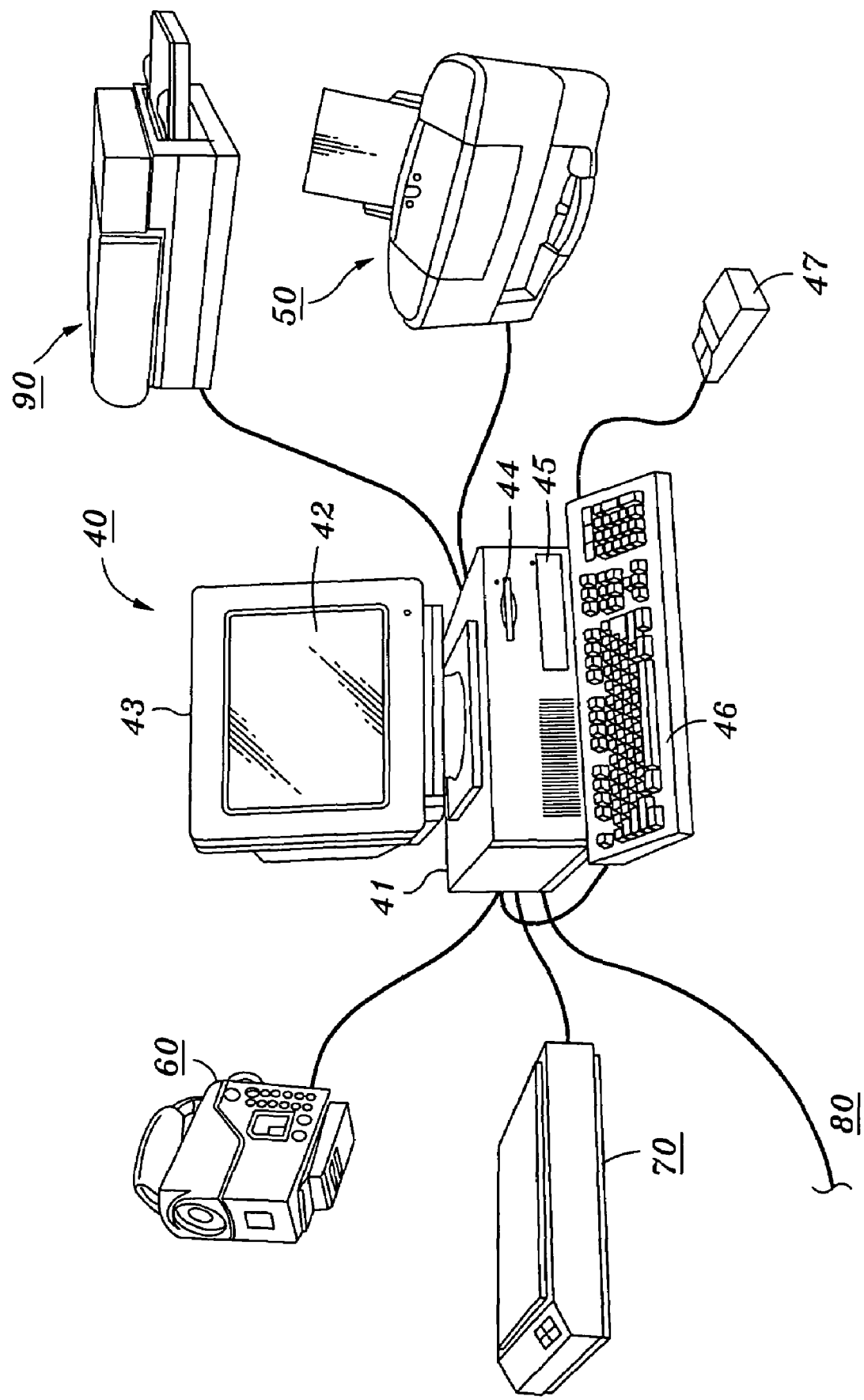
FIG. 1 is a representative view of a computing environment in which the present invention may be implemented according to one embodiment of the invention.

FIG. 1 shows a computing environment in which the present invention may be implemented. FIG. 1 depicts a representative computing system including computing equipment, peripherals and digital devices which may be used in connection with the practice of the present invention. Computing equipment 40 includes host 41 which generally comprises a personal computer (hereinafter "PC") having an operating system such as Microsoft® Windows® or Apple® Mac OS® or LINUX. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Computing equipment 40 also includes computer-readable memory media such as computer fixed disk 45 and floppy disk drive 44. Floppy disk drive 44 provides a means whereby computing equipment 40 can access information, such as image data, computer-executable process steps, application programs, etc. stored on removable memory media. In an alternative, information can also be retrieved through other computer-readable media such as a USB storage device connected to a USB port (not shown), or through network interface 80. Also, a CD-ROM drive and/or a DVD drive (not shown) may be included so that computing equipment 40 can access information stored on removable CD-ROM and DVD media.

Printer 50 is a color bubble jet printer, and is a first example of a color output device which forms color images on a recording medium such as paper or transparencies or the like. Printer 90 is a color laser printer, and is a second example of a color output device which also forms color images on a recording medium such as paper or transparencies or the like. Preferably, printer 50 and printer 90 form color images using cyan, magenta, yellow and black inks, although the present invention can be used with printers and devices which use other colorant combinations that include black. The invention is also usable with other color output devices, such as projectors, displays and the like, so long as the color output device is capable of being interfaced to computing equipment 40.

Digital color scanner 70 is a first example of a color input device, and is provided for scanning documents and images and sending the corresponding image data to computing equipment 40. Digital color camera 60 a second example of a color input device, and is provided for sending digital image data to computing equipment 40. Of course, computing equipment 40 may acquire digital image data from other sources such as a digital video camera, a local area network or the Internet via network interface 80.

Figure 2:
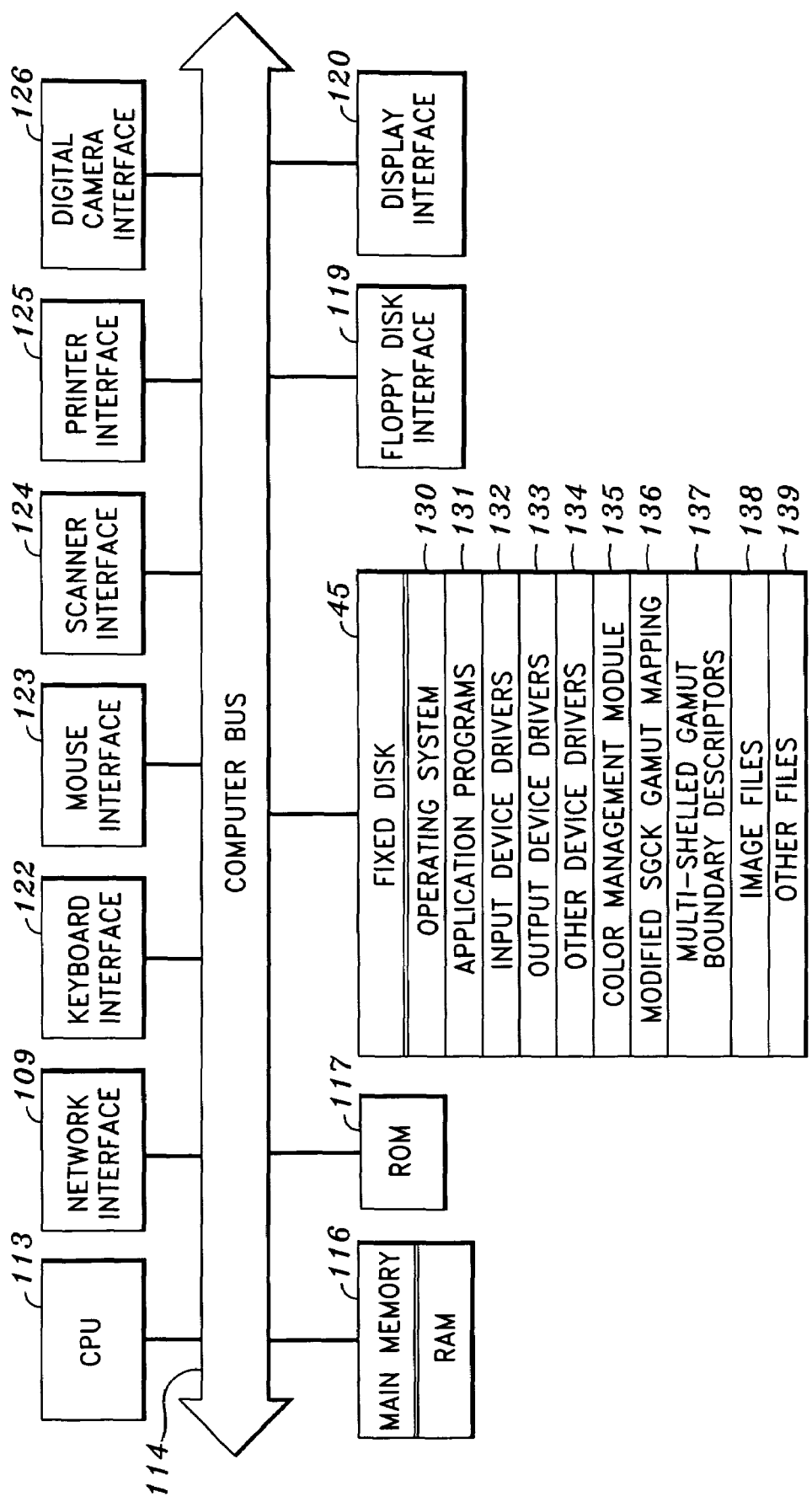
FIG. 2 is a detailed block diagram depicting the internal architecture of the computing device shown in FIG. 1 according to one embodiment of the invention.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as a main run-time transient memory, read only memory (ROM) 117, floppy disk interface 119, display interface 120 for monitor 43, keyboard interface 122 for keyboard 46, mouse interface 123 for pointing device 47, scanner interface 124 for scanner 70, printer interface 125 for printers 50 and 90, and digital camera interface 126 for digital camera 60.

RAM 116 interfaces with computer bus 114 so as to provide information stored in RAM 116 to CPU 113 during execution of software programs such as an operating system, application programs, color management modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable process steps need to access and/or modify the data.

As also shown in FIG. 2, fixed disk 45 contains operating system 130, application programs 131, such as word processing programs or a graphic image management programs. Fixed disk 45 also contains device drivers for software interface to devices, such as input device drivers 132, output device drivers 133, and other device drivers 134. Image files 138, including color image files, and other files 139 are available for output to color output devices and for manipulation by application programs.

Color management module (CMM) 135 manages colors during transport of an image from a source device to a destination device, such as from capture by digital camera 60 to printout by printer 50. CMM 135 generally comprises process steps that accept a source image in a source device dependent color system and generate a destination image in a destination device dependent color system. Using color profiles or other color characterizations of the source and destination device, CMM 135 will generally transform the source image to a device independent color system, possibly to a perceptual color system for better interpretation of rendering intent and better preservation of color fidelity, apply a gamut mapping from source to destination and then transform the gamut-mapped image to the destination device dependent color system. CMM 135 may be configured as a part of operating system 130, as part of an output device driver such as a printer driver, or as a stand-alone application program; it may also be configured as a plug-in or dynamic link library (DLL) to the operating system, device driver or application program.

One gamut mapping available to CMM 135 is modified SGCK gamut mapping 136. During gamut mapping, SGCK gamut mapping 136 accesses multi-shelled gamut boundary descriptors (GBDs) 137). Operation of modified SGCK gamut mapping 137, and properties and construction of multi-shelled GBDs 137, are discussed in more detail below.

"Shells" arise in various contexts in GBD modeling of devices. In the two aforementioned published applications by Newman, et al., it was proposed that the GBD should consist of several gamut shells. In respect of this additional shell structure, modified SGCK gamut mapping 136 is designed to map a shell in the source GBD to the corresponding shell in the destination GBD.

For different devices, including some "virtual devices" such as some RGB-based color spaces (e.g. sRGB space), construction of the gamut shell structure is an art that depends on the goal to be achieved, and it is highly device dependent. It is not the purpose of this invention to describe derivation of multi-shelled GBDs. However, to illustrate that it can be done, the following demonstrates how a 2-shell structure can be constructed for RGB capture devices.

Capture devices, such as scanners and cameras, are unique among all device classes in that, in the process to gather measurement data for device modeling, it is not possible to sample the device space uniformly, or in a user-specified manner. This is because a capture device would respond to external, device-independent stimuli as input, generating device values as output, not the other way. In other words, it is not possible to drive the capture device by specifying device values. A standard way to gather data for model characterization of a capture device is to use a characterization target, such as IT8.7 or Color Checker. Such targets have pre-defined XYZ values under specific operating conditions (illuminant, lighting, etc). An RGB capture device would respond to these XYZ stimuli with corresponding RGB values. A model of the device can be constructed after we analyze the relationship between the XYZ values and the device values. Incidentally, a "Reference Shell" can be constructed by taking the hull of the set of device independent colors obtained by routing the response RGB values through the device model. As should be clear, these RGB responses in general do not span the whole RGB space. So a "Plausible Shell" is constructed by constructing a hull of the set of device independent colors obtained by routing a regular sampling of the RGB space through the device model. In general, the Plausible Shell is strictly larger than the Reference Shell. In the case of capture devices, the Reference Shell is achievable by construction because it is generated by a characterization target. The Plausible Shell contains all colors possible from the device model, but there is no a priori knowledge that all the colors contained in it are achievable, because some RGB values may not be responses to any real life stimuli.

Modified SGCK gamut mapping 136 is an enhanced generalization of known SGCK mapping for the case where at least one of the GBDs, either from the source device or the destination device, has a 2-shell or a multi-shelled structure. For a 2-shell structure, the inner shell will be called the Reference Shell, while the outer shell will be called the Plausible Shell. The cases considered are:

(a) Both the source GBD and destination GBD have a 2-shell structure (b) The source GBD has a 2-shell structure; the destination GBD has only 1 shell (c) The source GBD has only 1 shell; the destination GBD has a 2-shell structure (d) Both the source GBD and destination GBD have only 1 shell Case (d) is just the well-known case. In cases (b) and (c), modified SGCK gamut mapping 136 introduces an intermediate geometric structure, called the "Induced Hue Slice", for the GBD that does not have 2 shells. The Induced Hue Slice will play a role that is similar to a hue slice that would be obtained if there was a shell. Construction of Induced Hue Slice is discussed below in a separate section titled "Induced Hue Slice". The general SGCK algorithm with 2 shells will be described for case (a), with the understanding that once the Induced Hue Slice construction is made known, the algorithm for case (a) can be applied to case (b) and (c) as well, with the Induced Hue Slice used in place of the hue slice constructed from a real shell. It is an advantage of this generalized SGCK algorithm for 2 shells that it is "continuous", in the sense that if the Reference Shell and Plausible Shell collapse onto one another, the algorithm will reduce to the standard one.

In order to describe the algorithm for case (a), the existing SGCK algorithm is formulated in a way that is suitable for generalization. It is convenient to break it down into 2 main steps, "Lightness Rescaling" and "Chroma Compression". Both will need to be generalized to the 2-shell setting.

The color space used herein is the CAM space as defined in CIECAM02. It should be noted that special properties of this CAM space are not being used, so other CAM spaces, including the older CIELAB, can be substituted without significant change.

[Standard SGCK (Prior Art)]

Figure 3:
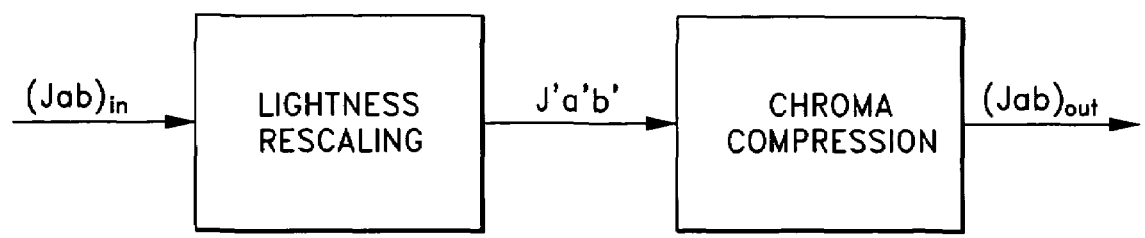
FIG. 3 is a functional view of the two steps in known SGCK gamut mapping.
Figure 4:
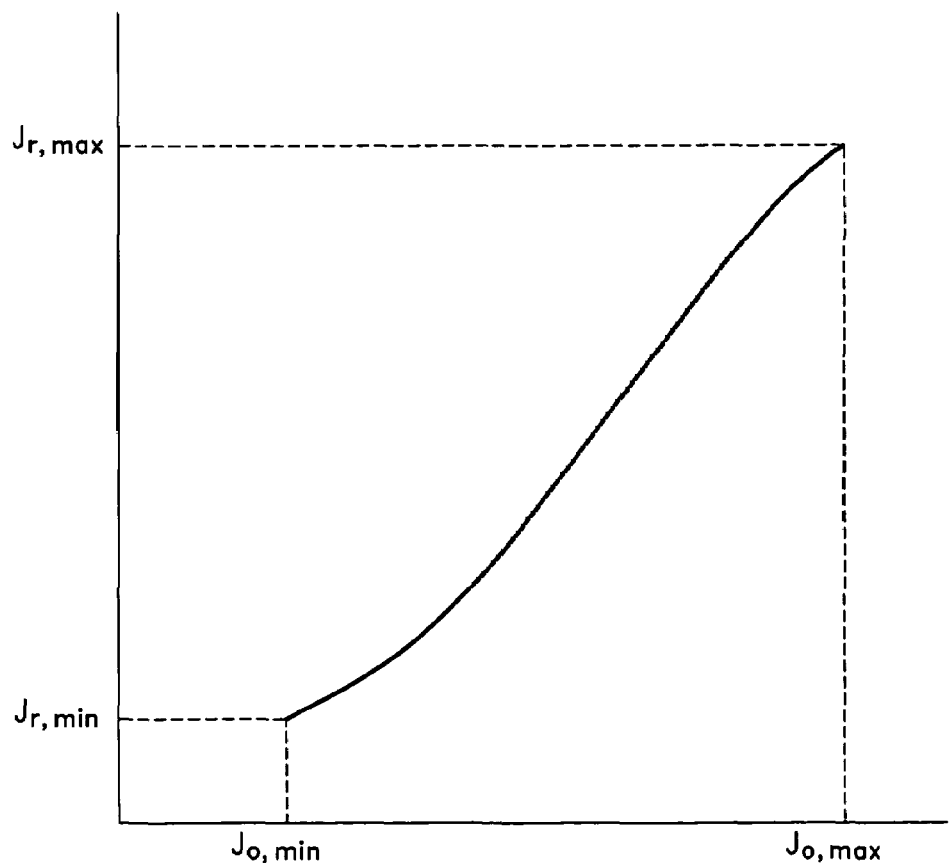
FIG. 4 is a view of a sigmoidal curve used in lightness rescaling.

The known SGCK algorithm consists of 2 steps, "Lightness Rescaling" and "Chroma Compression", see FIG. 3. The Lightness Rescaling module implements the sigmoidal lightness compression described in the aforementioned article by Braun, see FIG. 4. The sigmoidal compression maps the tonal range of the source device, $[J_{o,min}, J_{o,max}]$ to the tonal range of the destination device, $[J_{r,min}, J_{r,max}]$. It compresses lightness using the sigmoidal function instead of linear function, which allows for more encoding space for mid-tones. In addition, SGCK implements a chroma-dependency to the lightness rescaling, reducing the rescaling effect as chroma increases. That is, $$J_r = (1-p_c)J_o + p_c J_s$$

where $J_o$, $J_r$ are respectively the original (input) and reproduction (output) lightness, $J_s$ is the result of applying the sigmoidal function to $J_o$, and $p_C$ is a weighting factor, given by $$p_c = 1 - ((C^3)/(C^3 + 5 \times 10^5))^{1/2}$$

For reference later, a simple notation is used for the sigmoidal function:

$$J_s = S(J_o; J_{o,min}, J_{o,max}; J_{r,min}, J_{r,max})$$

One side note: Although the name "Lightness Rescaling" is used for this step, it is possible that it does more than just sigmoidal compression. For example, one can also implement, in addition to sigmoidal compression, a transform that will perform gray balance, in which case the step might change a and b as well as J. In other words, it is not assumed that the Lightness Rescaling step changes J only.

Figure 5:
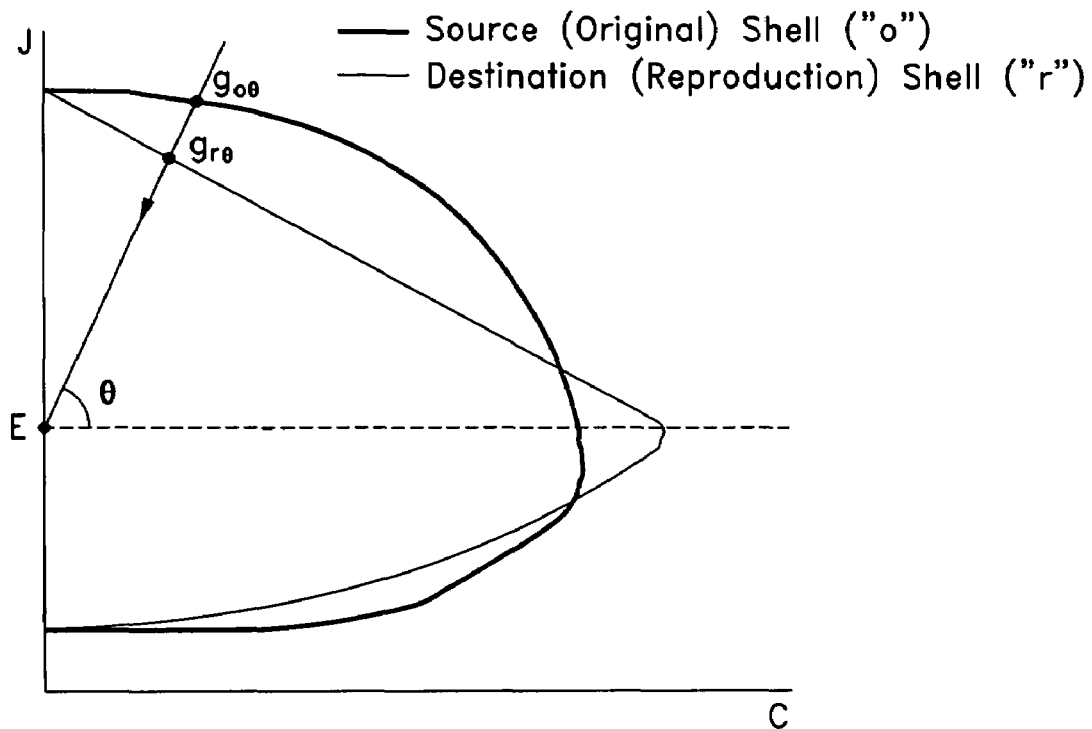
FIG. 5 is a view of the geometry of chroma compression.
Figure 6:
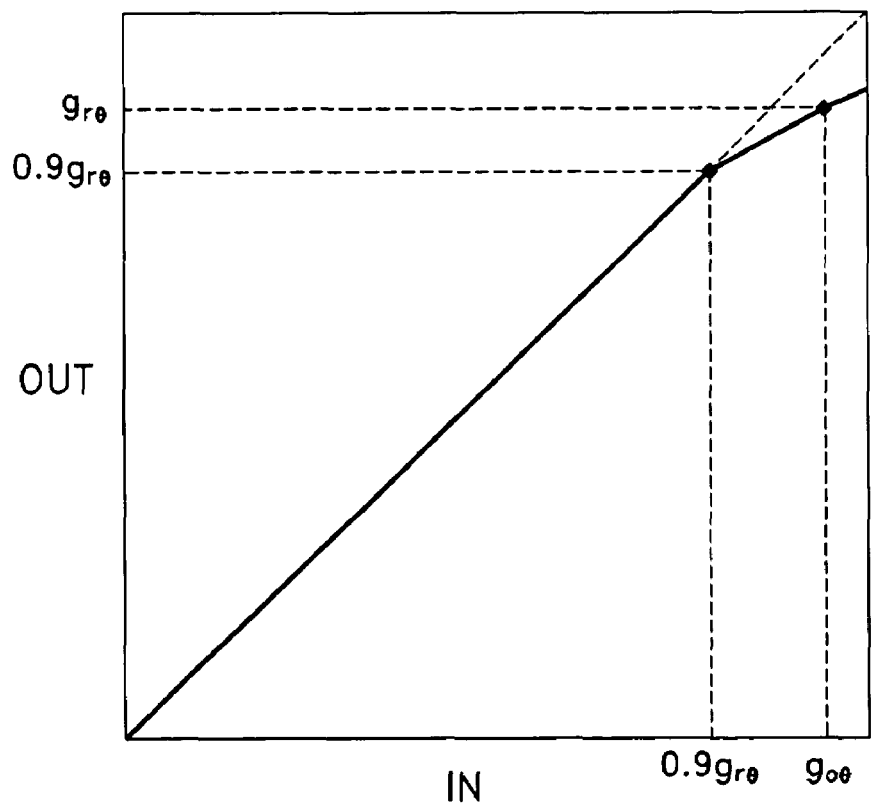
FIG. 6 is a graph showing the effect of a knee function during chroma compression.

The Chroma Compression step uses not the original source shell, but the shell obtained by applying the Lightness Rescaling to the original source shell. Because the Lightness Rescaling matches up the $J_{max}$'s and $J_{min}$'s, the "rescaled" source shell will have the same $J_{max}$ and $J_{min}$ as the destination shell, see FIG. 5. For convenience, the rescaled source shell is referred to as simply the source shell. Compression is performed towards the "knee point", which is the point on the J-axis that has the same J as the cusp of the destination shell. More specifically, points on the line joining the knee point and the input point are mapped according to the Knee Function, see FIG. 6. This is a piecewise linear function consisting of 2 linear pieces. Moreover, it only compresses colors beyond the "last" 10% of the gamut of the destination device, and leaves 90% of the destination gamut fixed.

[Modified SGCK Gamut Mapping For 2 Shells]

Both the Lightness Rescaling and Chroma Compression modules need to be modified to support the use of 2 shells. As we mentioned before, it is assumed that both source and destination GBDs have a 2-shell structure. If this assumption is not correct, then an induced hue slice is created as mentioned above.

[Generalized Lightness Rescaling]

Existence of 2 shells for both source and destination GBD means that a set of 4 points is mapped from the source GBD to a corresponding set in the destination GBD:

$$(J_{o,min,pla}, J_{o,min,ref}, J_{o,max,ref}, J_{o,max,pla}) \rightarrow (J_{r,min,pla}, J_{r,min,pla}, J_{r,max,ref}, J_{r,max,pla})$$

where the subscripts have the following meanings:
o or r: "original" (source) or "reproduction" (destination)
min or max: minimum neutral lightness or maximum neutral lightness
pla or ref: Plausible Shell or Reference Shell The ordering in each quadruple is also the expected relative magnitudes of these points.

The Lightness Rescaling map uses similar equations as in the standard case:

$$J_r = (1-p_c)J_o + p_c J_s$$

$$p_c = 1 - ((C^3)/(C^3 + 5\times 10^5))^{1/2}$$

but $J_s$ is defined in a piecewise manner as follows:

$$J_s = \begin{cases} J_{r,max,ref} + \frac{J_{r,max,pla} - J_{r,max,ref}}{J_{o,max,pla} - J_{o,max,ref}}(J_o - J_{o,max,ref}) & \text{if } J_o \geq J_{o,max,ref} \\ S(J_o; J_{o,min,ref}, J_{o,max,ref}; J_{r,min,ref}, J_{r,max,ref}) & \text{if } J_{o,min,ref} < J_o < J_{o,max,ref} \\ J_{r,min,ref} + \frac{J_{r,min,pla} - J_{r,min,ref}}{J_{o,min,pla} - J_{o,min,ref}}(J_o - J_{o,min,ref}) & \text{if } J_o \leq J_{o,min,ref} \end{cases}$$

Figure 7:
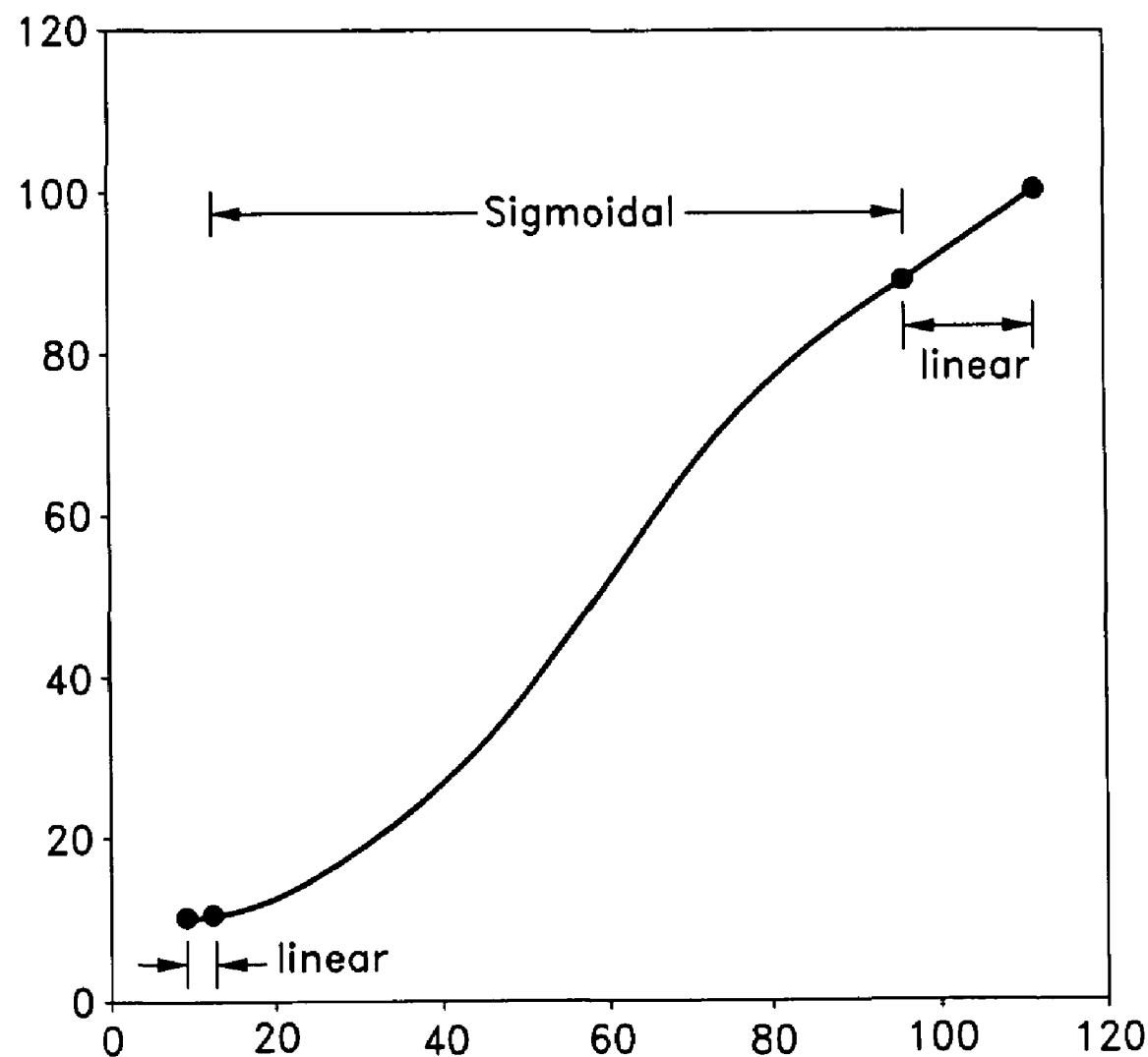
FIG. 7 is a view showing the linear sigmoidal regions of lightness rescaling in modified SGCK gamut mapping.

In other words, lightness rescaling maps the reference shell of the original source to the reference shell of the destination, and maps the plausible shell of the original source to the plausible shell of the destination. The mapping is sigmoidal within the reference shell, and linear outside. See FIG. 7.

[Generalized Chroma Compression]

Figure 8:
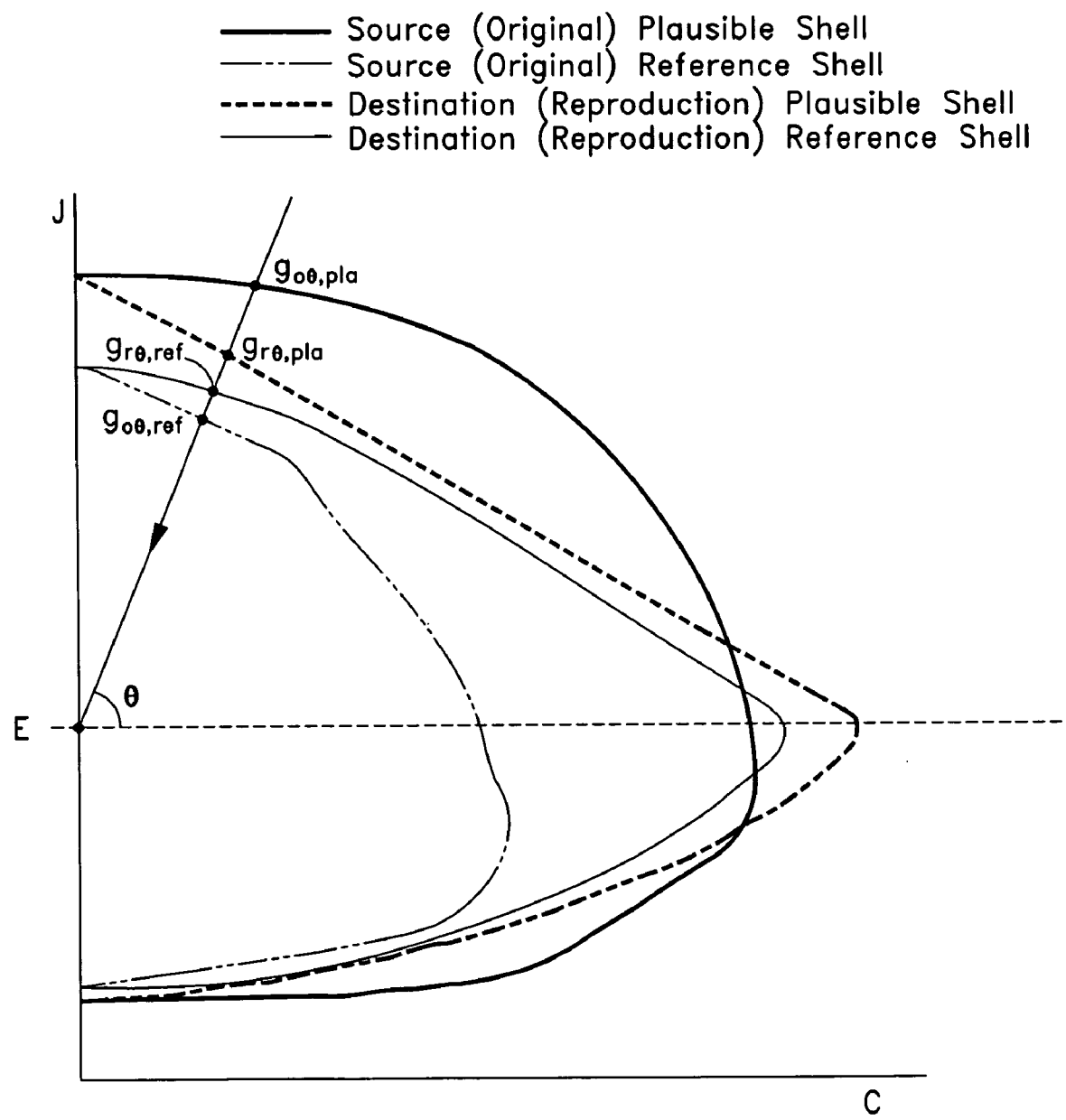
FIG. 8 is a view of the geometry of chroma compression.

After the Lightness Rescaling map has been applied to the destination shells, the source and destination Reference and Plausible Shells are now aligned on the neutral axis. FIG. 8 depicts the general situation, which shows a cross-sectional view of the shells at a hue angle. The hue angle is that of the input point to the SGCK algorithm. The term "hue slices" is used to refer to these cross-sections of the shells. The basic SGCK algorithm says that one should compress the point towards the destination cusp. For multi-shelled GBDs, there are 2 destination shells, and they could have different cusps. A decision would need to be made as to which one to use. In the following discussion, it is assumed that the cusp of the destination Plausible Shell will be used. This point is labeled E in FIG. 8. It should be noted that there is nothing in the algorithm that forbids the choice of using the cusp of the destination's Reference Shell.

Generally speaking, chroma compression according to the invention involves a mapping of the reference shell of the original source to the reference shell of the destination, and a mapping of the plausible shell of the original source to the plausible shell of the destination. As noted above, it is ordinarily unnecessary to consider the entirety of the shells, since a hue slice is ordinarily sufficient to perform the desired mappings.

Similar to the SGCK in the standard case of 1 shell, 90% of the points inside the destination Reference Shell are left intact. The Chroma Compression map is constructed as a piecewise linear function that conforms with the following definition:

0 → 0
$g_{o\theta,ref} \rightarrow g_{r\theta,ref}$
$g_{o\theta,pla} \rightarrow g_{r\theta,pla}$
$0.9 g_{r\theta,ref} \rightarrow 0.9 g_{r\theta,ref}$ if $0.9 g_{r\theta,ref} < g_{o\theta,ref}$ At this point, it may help to clarify a looseness of notation that is employed consistently. The "g" notation appears in both the figures and the equations. When it is used in a figure with hue slices, it refers to a geometric point. When it is used in an equation, it refers to a number, the length of the vector from the point E to the point in question. It should be clear what the context is in every situation.

In order to ensure smoothness and also to forbid chroma expansion, we also clip the resulting piecewise linear function to be bounded above by the identity function, i.e. the compression factor is at most 1. In other words, if $PLCM(C_{in})$ is the piecewise linear map constructed using the above 3 or 4 pairs of points, then the final chroma compression map is given by $$C_{out} = \min(PLCM(C_{in}), C_{in})$$

Figure 9A:
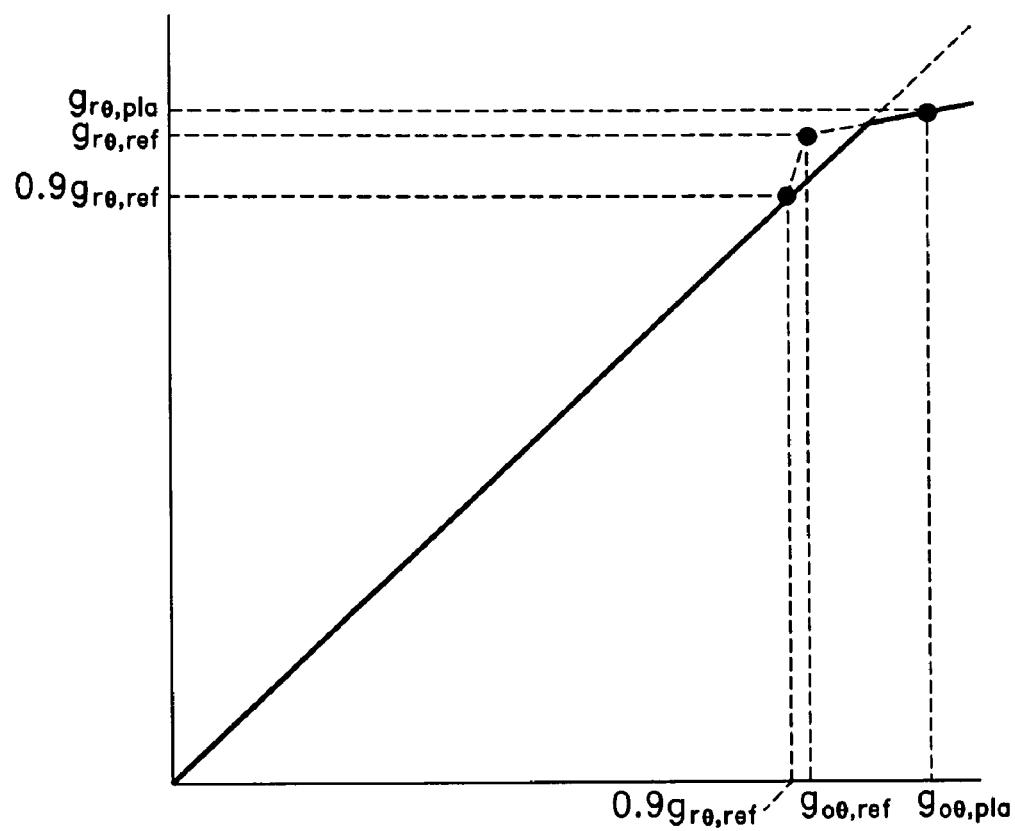
FIGS. 9A, 9B and 9C show the effects of limiting chroma compression by the identity function according to three separate possibilities.
Figure 9B:
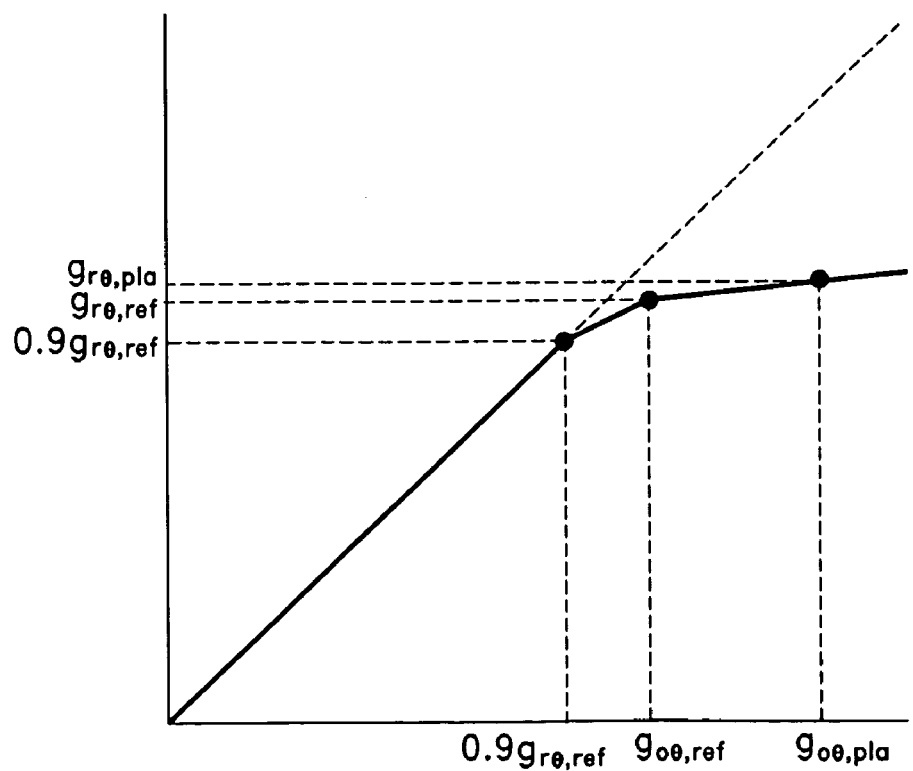
Figure 9C:
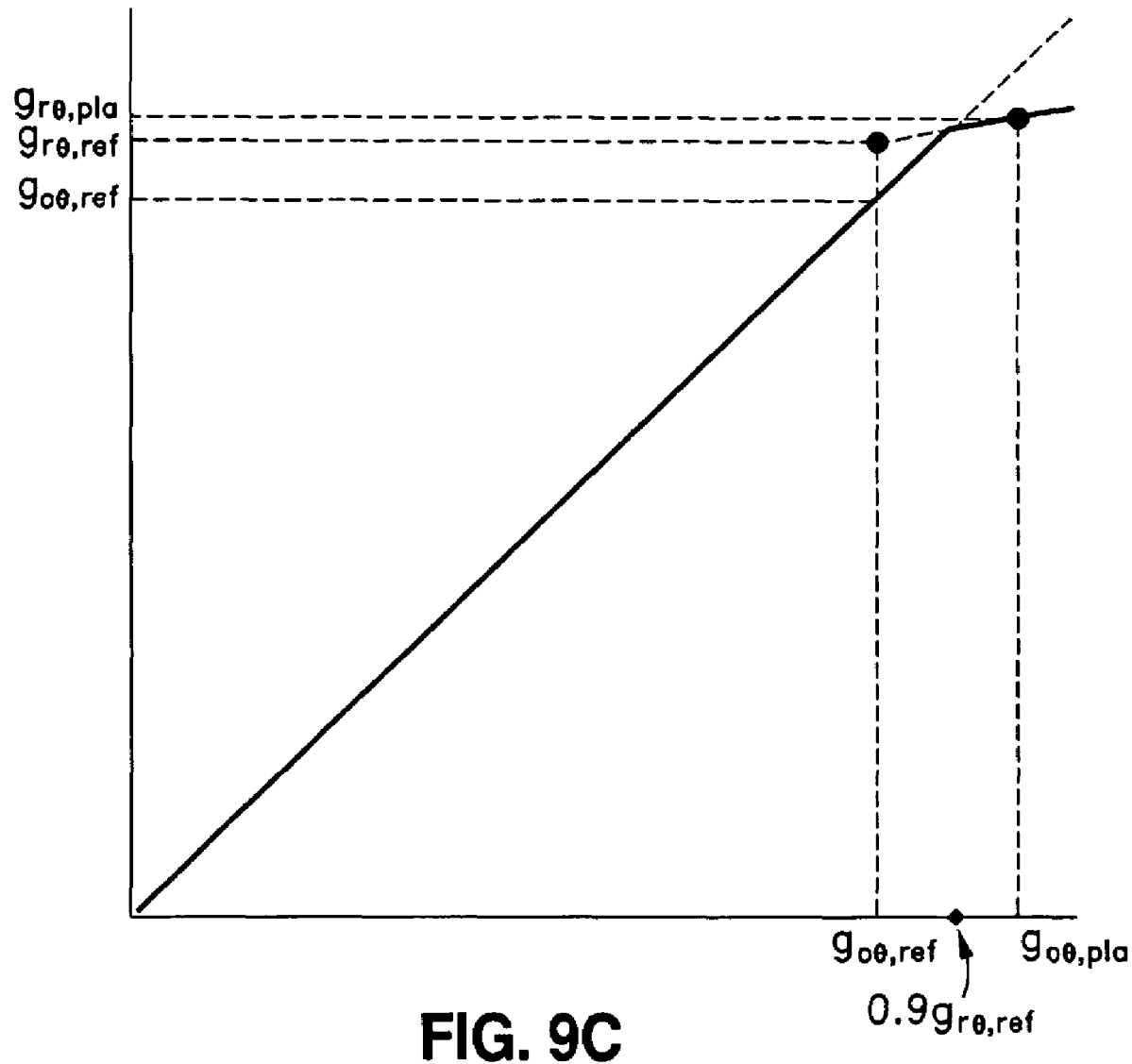

FIG. 9 shows the compression function for some scenarios with different values of the g's.

It should also be noted that in both cases of Lightness Rescaling and Chroma Compression, the algorithm reduces to the 1-shell case when the Reference Shell and Plausible Shell collapse onto one another.

[Induced Hue Slice]

In the mixed cases where one GBD has 1 shell, and the other has 2, a shell is constructed for the GBD with only 1 shell. In fact, it is not actually necessary to construct a shell in the full Jab space. Because SGCK operates on hue slices, it is enough to construct a hue slice.

There are two situations where a hue slice might be constructed. In the first, where the source or destination GBD has only a single shell, then an inner shell is constructed. In the second, the GBD might already have two shells, but one of them is unsuitable or is a poor match with the other, for reasons discussed below. In this second situation, an outer shell is constructed. Discussions of both situations follow.

[Constructing an Inner Shell]

In this case, one shell already exists and we want to construct an artificial shell that is contained in it. The original shell can then be thought of as the Plausible Shell, while the new shell can be thought of as the Reference Shell. For concreteness of the following example, it is assumed that this operation is to be performed on the destination GBD, and the source GBD has already a 2-shell structure. The labels "o" (source) and "r" (destination) can be interchanged without any impact on the following algorithm.

First, the destination Reference hue slice is determined on the neutral axis, i.e. the $J_{r,min,ref}$ and $J_{r,max,ref}$ of the hue slice. This is done using the following algorithm. The determination of these as the first step is often a logical necessity because they are needed to construct the Lightness Rescaling map, which will then be applied to generate the rescaled source shells.

$$J_{r,min,ref} = \frac{J_{r,min,pla} + J_{r,max,pla}}{2} + \lambda_{low}\left(J_{r,min,pla} - \frac{J_{r,min,pla} + J_{r,max,pla}}{2}\right)$$

$$J_{r,max,ref} = \frac{J_{r,min,pla} + J_{r,max,pla}}{2} + \lambda_{high}\left(J_{r,max,pla} - \frac{J_{r,min,pla} + J_{r,max,pla}}{2}\right)$$

The factors $\lambda_{low}$ and $\lambda_{high}$ control the separation between the Plausible Shell and Reference Shell. A value of 1 means the $J_{min}$'s or $J_{max}$'s coincide. Their values are "induced" from the source Reference Shell and source Plausible Shell:

$$J_{mid} = \frac{J_{o,min,ref} + J_{o,max,ref}}{2}$$

$$\lambda_{low} = F_{low} + (1 - F_{low})\frac{J_{mid} - J_{o,min,ref}}{J_{mid} - J_{o,min,pla}}$$

$$\lambda_{high} = F_{high} + (1 - F_{high})\frac{J_{max,ref} - J_{mid}}{J_{o,max,pla} - J_{mid}}$$

The factors $F_{low}$ and $F_{high}$ are tunable parameters that must lie between 0 and 1. If the value is 0, then the $J_{min}$ or $J_{max}$ are directly induced from the source shells. Exemplary values are $F_{low}=0.95$, $F_{high}=0.1$.

The term tunable parameter is used to refer to parameters in the algorithms that are related to aesthetics. Depending on the actual implementation, they may not necessarily be "tunable" in the sense that the system would solicit user input, e.g. a particular system implementing this algorithm may use another algorithm to determine these values. But these parameters are not determined "intrinsically", either mathematically or logically, but rather, by aesthetics, which may depend on the particular situation such as device type.

Figure 10:
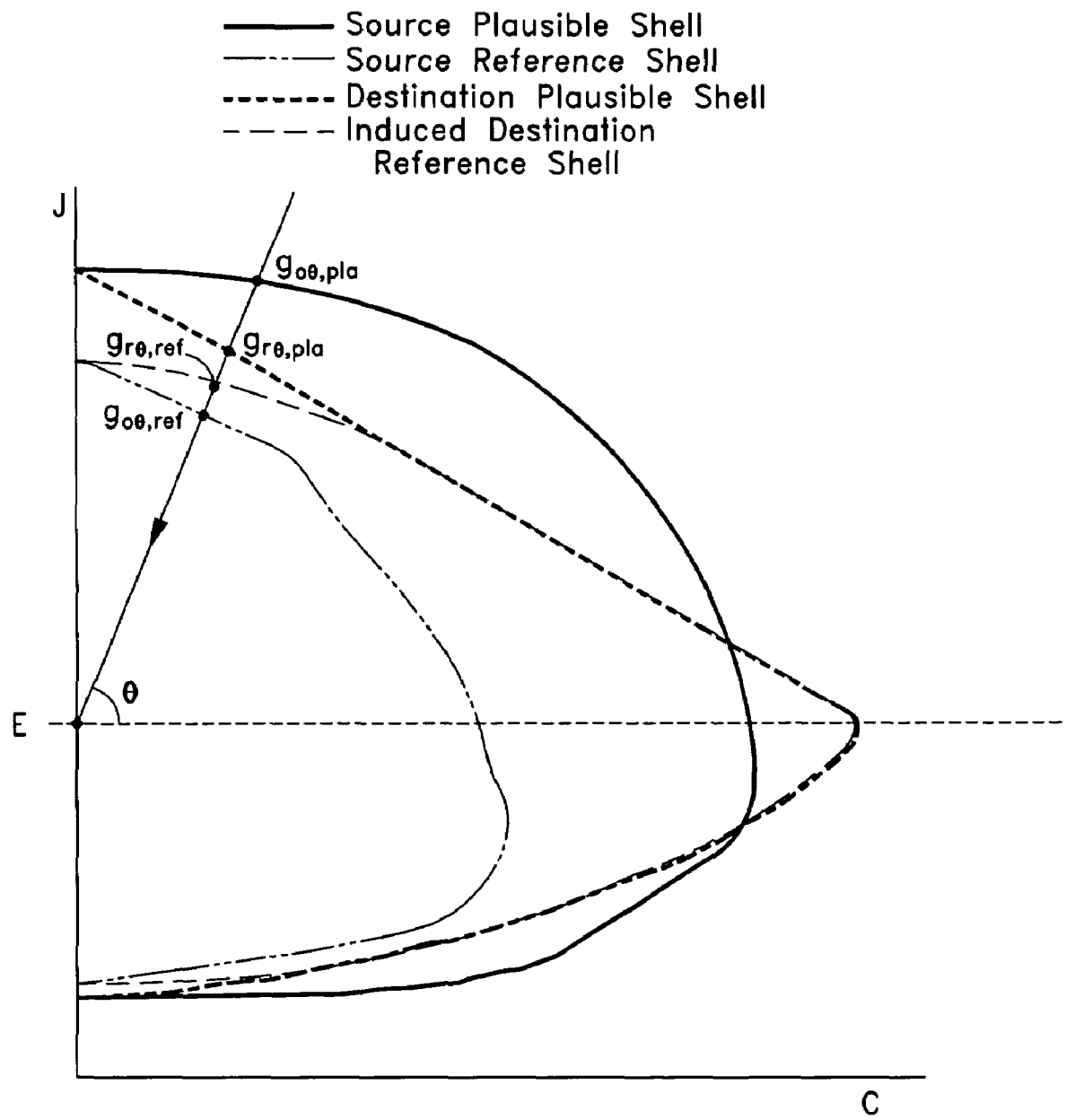
FIG. 10 shows construction of an inner hue slice according to the aforementioned application Ser. No. 11/220,751.

The Lightness Rescaling map may now be constructed. When it is applied to the source shells, the situation is similar to FIG. 8, except that there is no destination Reference Shell, or equivalently, destination Reference hue slice. It is sufficient to define $g_{r\theta,ref}$:

$$g_{r\theta,ref} = g_{r\theta,pla} \cdot \Omega\left(\frac{g_{o\theta,ref}}{g_{o\theta,pla}}, \theta\right)$$

$$\Omega(p, \theta) = 1 - (1 - p)\left(\frac{\theta}{90}\right)^{2n}$$

where n=2 and θ is measured from the positive C-axis in degrees. FIG. 10 shows a typical computation. It is clear that by construction, the induced Reference hue slice has the same cusp as the original Plausible hue slice (θ=0) for the destination, while it matches the $J_{min}/J_{max}$ of the source Reference hue slice (θ→±90) for the original source. In other words, for these values of tunable parameters, when constructing an induced inner hue slice for the reference shell of the destination, the induced hue slice starts at the $J_{max}$ of the source and ends at the $J_{min}$ of the source, but otherwise is close to or approaches the existing outer (plausible) hue slice of the destination.

[Construction of an Inner Shell According to an Embodiment of the Invention]

In experimentation on the inner shell constructed according to the preceding section (FIG. 10), it has been found that construction of the inner shell can be improved, especially when constructing an inner shell for a source device for use with a destination device that already has a multi-shelled GBD. More specifically, the preceding section proposed that an induced hue slice be constructed in the source GBD so that after the construction, there would be both an inner ("reference") and outer ("plausible") hue slice. Furthermore, the induced hue slice was constructed using a blending function so that at the "latitude" (notation θ) corresponding to the cusp of the destination plausible hue slice, the induced hue slice would match the existing hue slice in the source GBD.

Figure 11:
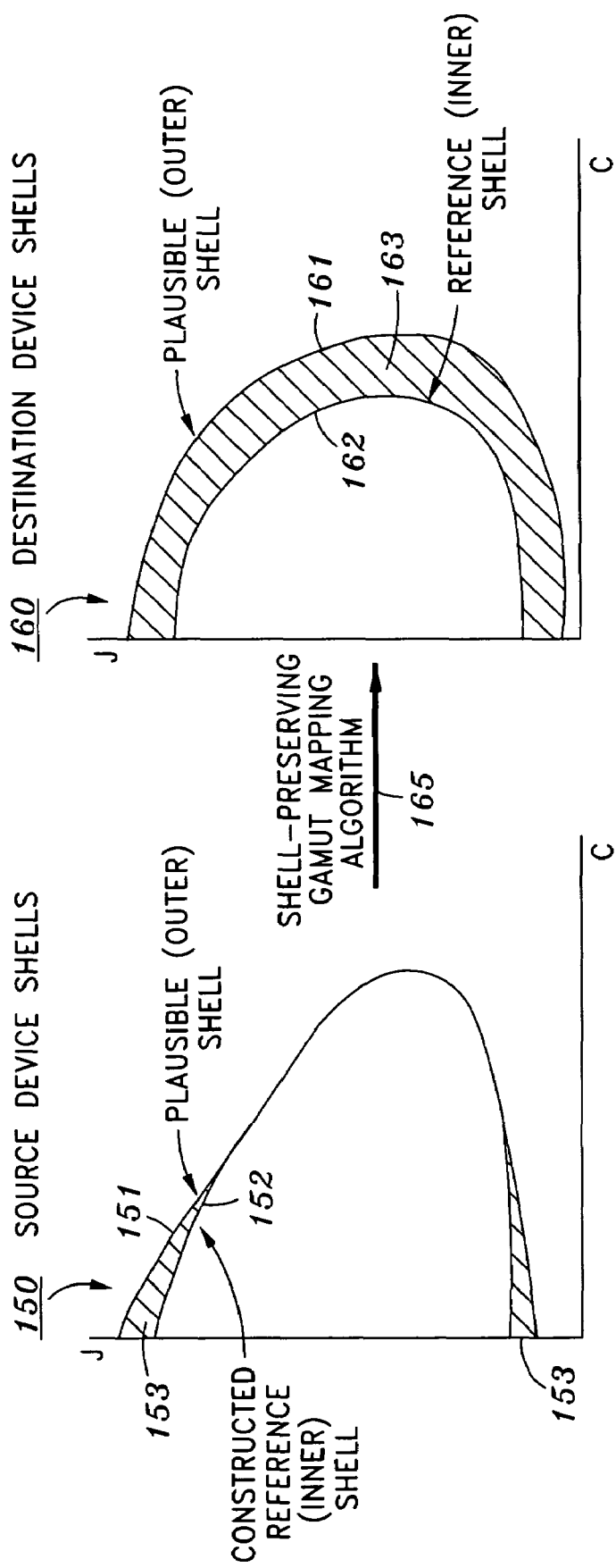
FIG. 11 is a view showing gamut mapping using the constructed hue slice of FIG. 10.

FIG. 11 shows this situation. FIG. 11 shows the source device shells 150 and the destination device shells 160 in one hue slice. The source device shells 150 include the plausible outer shell 151 (which is given) and the reference inner shell 152 (which is constructed from the outer shell 151, as described in the preceding section), both for the source device. The destination device shells 160 include the plausible outer shell 161 and the reference inner shell 162, both for the destination device. A shell-preserving GMA 165 maps colors from the source device reference shell to corresponding colors in the destination device reference shell, and maps colors from the source device plausible shell to corresponding colors in the destination device plausible shell.

Note that by this construction, the induced hue slice matches the existing outer hue slice very closely, except when the colors are near the neutral axis. There are two issues in this algorithm.

First, since the source reference hue slice is essentially identical to the source plausible hue slice off the neutral axis, most of the chromatic colors will be rendered in the destination reference hue slice. If the destination plausible hue slice is considerably larger than the destination reference hue slice, this is a waste. More specifically, shell-preserving GMAs map colors in the source reference shell to colors in the destination reference shell, and map colors in the source plausible shell to colors in the destination plausible shell. But as shown in FIG. 11, because of the way that inner reference shell 152 is constructed, almost all source colors fall within the inner reference shell 152, and are therefore mapped to colors in the destination inner reference shell 162. As a consequence, colors in the destination gamut represented by cross-hatched region 163 are under-utilized and are largely wasted. The only colors that might be mapped to destination region 162 are colors in the cross-hatched region 153 of the source. However, region 153 is relatively small, such that almost all source colors lie within the confines of the inner reference shell 152 and are therefore mapped to destination colors within the confines of the inner reference shell 162. Almost no colors are mapped to colors in cross-hatched region 163, and as a consequence, a significant amount of useful gamut of the destination is wasted.

Second, the blending function gives a blending factor of one ("1") at the latitude corresponding to the cusp of the destination plausible hue slice, which makes the source reference hue slice and source plausible hue slice coincide at this latitude. Since this latitude does not in general correspond to the cusp of the source hue slice, this construction does not have any particular significance and in that sense, is totally arbitrary.

The invention herein addresses the above points by constructing an inner reference shell for the source device such that it remains separated from the outer plausible shell for the source device. As a result, relatively more colors fall into the region between the inner and outer shells of the source device, and consequently relatively more colors are mapped to cross-hatched region 163 of the destination device, which provides better and less-wasteful use of the destination gamut.

Figure 12:
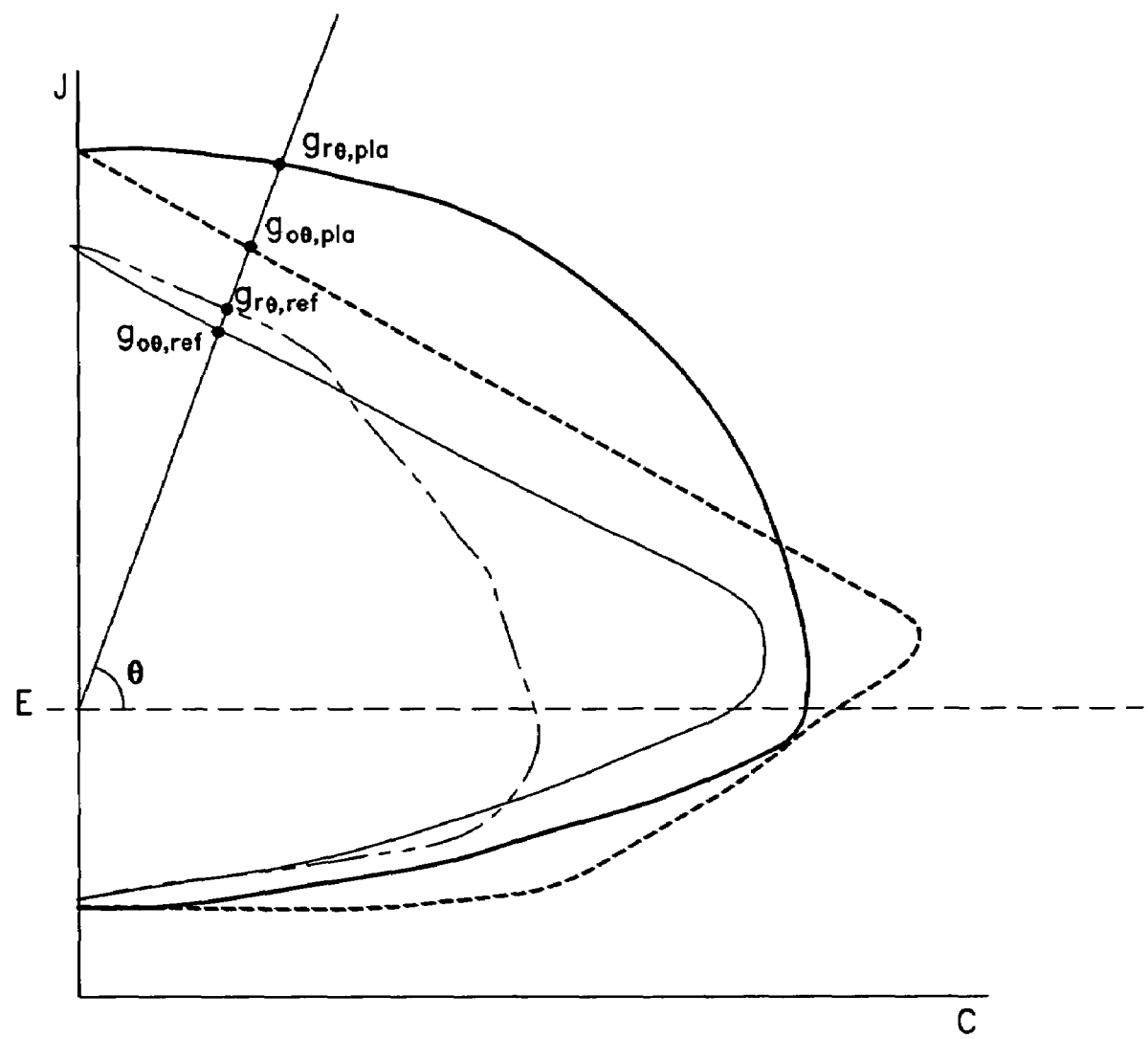
FIG. 12 is a view for explaining construction of an inner hue slice according to the invention.

FIG. 12 shows construction of the induced hue slice for the source GBD. Instead of making a hue slice that matches the existing hue slice off the neutral axis, the relative distance between the reference and plausible hue slice in the destination GBD is "copied" onto the source GBD to produce a new hue slice. As should be clear from the figure, this construction will allow a proportionate region in the source GBD to be rendered as colors in the destination GBD that is outside the reference shell but within the plausible shell. It results in more optimal use of the destination gamut; it also avoids overcompression which might otherwise appear as loss of chromatic details.

Details of this construction are as follows. FIG. 12 shows the existing source hue slice, destination reference hue slice and destination plausible hue slice. E is the point on the neutral axis with the same lightness (J) as the cusp of the destination plausible hue slice. A ray emanating from E at latitude θ will intersect the existing hue slices at $g_{o\theta,pla}$, $g_{r\theta,ref}$ and $g_{r\theta,pla}$. The goal is to provide an algorithm to construct $g_{o\theta,ref}$. This can be achieved by the following equation:

$$g_{o\theta,ref} = g_{o\theta,pla} \cdot \frac{g_{r\theta,ref}}{g_{r\theta,pla}}$$

According to this equation, the inner reference shell of the source device is constructed by reducing the outer plausible shell of the source device by the ratio of the inner reference shell of the destination device relative to the outer plausible shell of the destination device.

Although a ratio has been used in the above construction, other techniques can be used to obtain the inner shell by reducing the outer shell based at least in part on the amount by which the inner shell of the destination device is smaller than the outer shell of the destination device.

Figure 13:
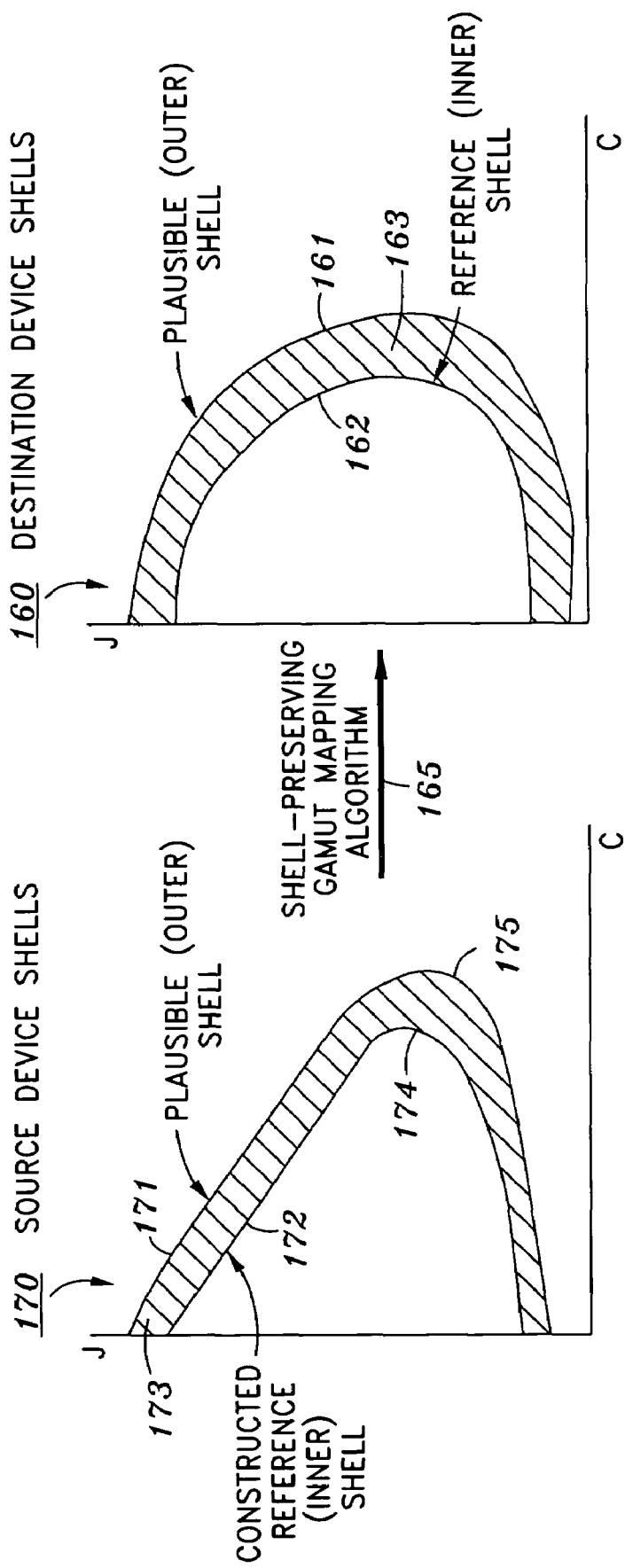
FIG. 13 is a view showing gamut mapping using the constructed hue slice of FIG. 12.

FIG. 13 shows the resulting situation, for comparison against FIG. 11. In FIG. 13, source device shells 170 in one hue slice include outer shell 171 and inner shell 172 constructed from the outer shell as described above. Destination device shells 160 remain the same as in FIG. 11. As seen in FIG. 13, the size of cross-hatched region 173 is larger than that of cross-hatched region 153 of FIG. 11. As a consequence, more colors are mapped to region 163 of the destination device, resulting in better and less-wasteful use of the destination gamut. In addition, the cusp 174 of the constructed inner shell is no longer constrained to match the cusp 175 of the outer shell, resulting in less arbitrariness in the construction of the inner shell.

The construction of this section can be considered a preferred alternative way to construct an induced inner shell. The construction in the preceding section is usually more appropriate for a destination GBD. The construction in this section is usually more appropriate for a source GBD. They may co-exist. In fact, for the same device that can serve as either source device or destination device, such as a monitor, the construction in the preceding section should be used when the device is used as a destination device, and the construction described here should be used when the device is used as a source device.

In addition, the construction of a multi-shelled GBD according to this section can be applied to gamut mapping algorithms other than an SGCK GMA. For example, GMAs that implement a gamut compression strategy (as opposed to gamut clipping) can potentially be modified to preserve gamut shells. While SGCK compresses towards the cusp, other lines of direction, such as constant lightness, compression towards center, etc have been proposed, see Morovic, et al., "The Fundamentals of Gamut Mapping: A Survey", Journal of Imaging Science and Technology, 45/3:283-290, for a survey of various proposed GMAs.

[Constructing an Outer Shell]

Here the situation is different. A GBD might already have 2 shells, and a shell is constructed lying between them. The new shell will then replace the original Plausible Shell. The reason why a new shell might be needed lies in the Lightness Rescaling map and will be clear from inspection of FIG. 7. It is possible that the straight line pieces at high and low end lightness have very steep slopes. This would be the case if the source Reference and Plausible Shells are very close to each other whereas the destination Reference and Plausible Shells are not. Steep slopes should be avoided in the Lightness Rescaling map because this would cause discontinuity in the tones. This can be achieved by using an intermediate value in $[J_{r,max,ref}, J_{r,max,pla}]$ and/or $[J_{r,min,pla}, J_{r,min,ref}]$ such that the slopes are limited to some predefined value. This in turn necessitates the construction of a new shell, or equivalently hue slice, in between the destination Plausible and Reference Shells.

Figure 14:
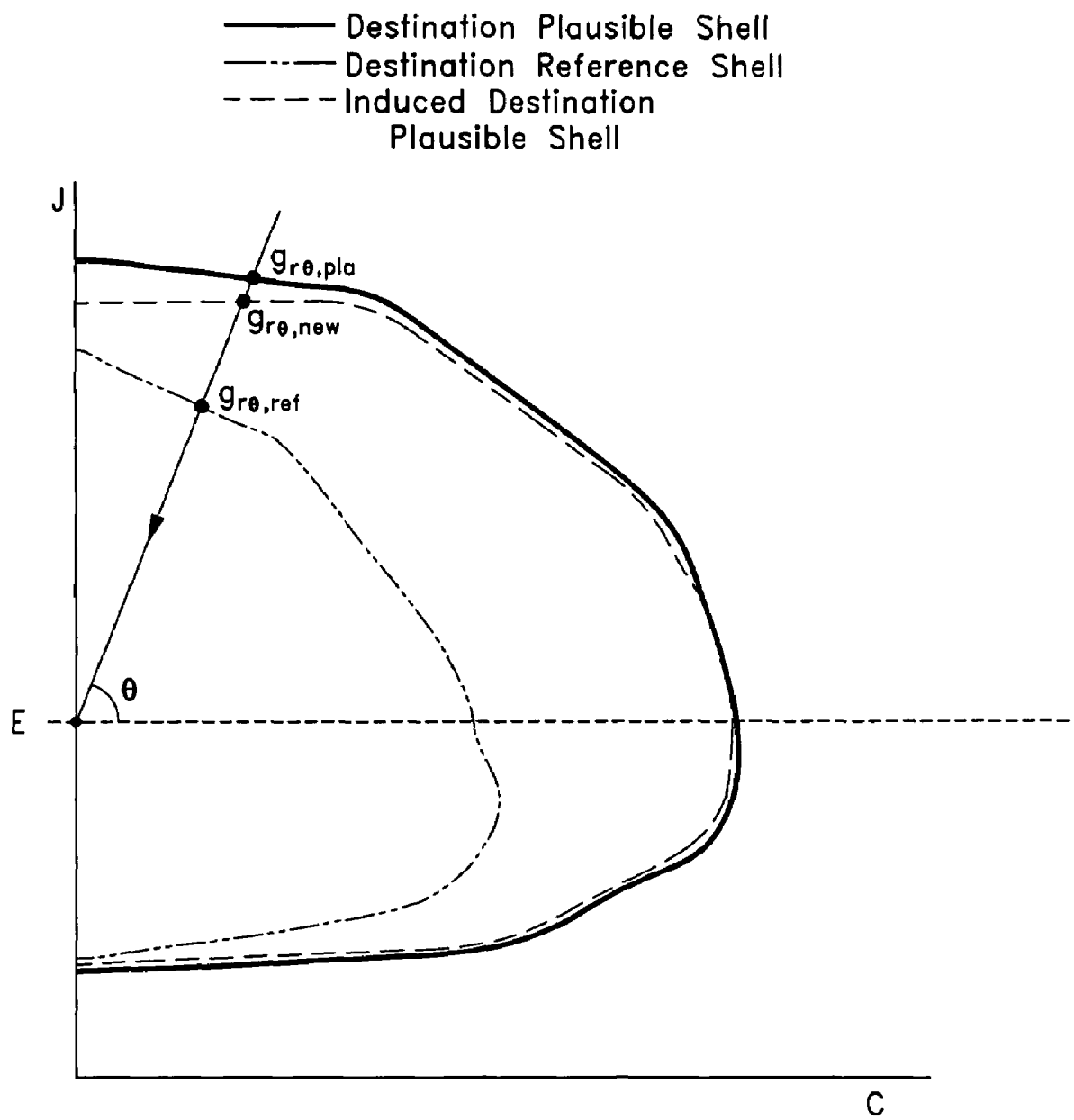
FIG. 14 shows construction of a replacement for an outer hue slice.

To be completely concrete, assume that new $J_{r,max,new}$ and $J_{r,min,new}$ are chosen for the destination Plausible Shell such that $$\frac{J_{r,max,new} - J_{r,max,ref}}{J_{o,max,pla} - J_{o,max,ref}} \leq K$$

$$\frac{J_{r,min,new} - J_{r,min,ref}}{J_{o,min,pla} - J_{o,min,ref}} \leq K$$

where K is a predetermined, acceptable maximum value for the slope, e.g. K=12. This is also a tunable parameter as defined above. Construction of the new shell, or equivalently hue slice, can be specified by $$g_{r\theta,new} = g_{r\theta,ref} + (g_{r\theta,pla} - g_{r\theta,ref}) \cdot \Phi(\theta; p_{low}, p_{high})$$

$$p_{high} = \frac{J_{r,max,new} - J_{r,max,ref}}{J_{r,max,pla} - J_{r,max,ref}}$$

$$p_{low} = \frac{J_{r,min,new} - J_{r,min,ref}}{J_{r,min,pla} - J_{r,min,ref}}$$

$$\Phi(\theta; p_{low}, p_{high}) = \begin{cases} 1 - (1 - p_{low})\left(\frac{\theta}{90}\right)^{2n} & \text{if } -90 \leq \theta \leq 0 \\ 1 - (1 - p_{high})\left(\frac{\theta}{90}\right)^{2n} & \text{if } 0 < \theta \leq 90 \end{cases}$$

where n=2. It is easy to see that this new shell has the same cusp as the original destination Plausible Shell, see FIG. 14.

[Modified SGCK Gamut Mapping With More Than Two Shells]

The following paragraphs elaborate on how the principles outlined above for 2 shells can be used to extend to situations with more than 2 shells. The case of 3 shells is specifically assumed, although practitioners with ordinary skill in the art will be able to recognize the trend and extend it to multiple shells in general.

Denoting the 3 shells by s0, s1 and s2 with s0 being the innermost shell and s2 the outermost shell, while using similar notations otherwise, Lightness Rescaling and Chroma Compression will be generalized as follows.

[Lightness Rescaling With Three Shells]

With input $J_o$, the output $J_r$ is given by:

$$J_r = (1 - p_c)J_o + p_c J_s$$

$$p_c = 1 - ((C^3)/(C^3 + 5 \times 10^5))^{1/2}$$

where $J_s$ is defined in a piecewise manner as follows:

$$J_s = \begin{cases} J_{r,max,s1} + \frac{J_{r,max,s2} - J_{r,max,s1}}{J_{o,max,s2} - J_{o,max,s1}}(J_o - J_{o,max,s1}) & \text{if } J_o \geq J_{o,max,s1} \\ J_{r,max,s0} + \frac{J_{r,max,s1} - J_{r,max,s0}}{J_{o,max,s1} - J_{o,max,s0}}(J_o - J_{o,max,s0}) & \text{if } J_{o,max,s1} > J_o \geq J_{o,max,s0} \\ S(J_0; J_{o,min,s0}, J_{o,max,s0}, J_{r,min,s0}, J_{r,max,s0}) & \text{if } J_{o,min,s0} < J_o < J_{o,max,s0} \\ J_{r,max,s0} + \frac{J_{r,min,s1} - J_{r,min,s0}}{J_{o,min,s1} - J_{o,min,s0}}(J_o - J_{o,min,s0}) & \text{if } J_{o,min,s1} < J_o \leq J_{o,min,s0} \\ J_{r,min,s1} + \frac{J_{r,min,s2} - J_{r,min,s1}}{J_{o,min,s2} - J_{o,min,s1}}(J_o - J_{o,min,s1}) & \text{if } J_o \leq J_{o,min,s1} \end{cases}$$

In other words, sigmoidal on the innermost shell, and piecewise linear outside.

[Chroma Compression with Three Shells]

This is again a piecewise linear function specified by the following anchor points:

$0 \rightarrow 0$ $g_{o\theta,s0} \rightarrow g_{r\theta,s0}$ $g_{o\theta,s1} \rightarrow g_{r\theta,s1}$ $g_{o\theta,s2} \rightarrow g_{r\theta,s2}$ $0.9 g_{r\theta,s0} \rightarrow 0.9 g_{r\theta,s0}$ if $0.9 g_{r\theta,s0} < g_{o\theta,s0}$ The resulting piecewise linear function is capped from above by the identity function (diagonal graph) to make sure that chroma expansion and abrupt jump in chroma are disallowed.

[Unequal Number of Shells in Source and Destination GBD]

This describes processing when there are different number of shells in source and destination GBD. Instead of the 4 cases described above when the number of shells is 2, there will be 9 cases when the number of shells is 3, in which 4 cases are already covered if none of the GBDs has more than 2 shells. Of the remaining 5 cases, 2 cases are described in detail below, and the rest of the cases are evident once these 2 cases are understood.

[Case: Source GBD Has 3 Shells, Destination GBD Has 1 Shell]

2 inner shells are induced for the destination GBD. Using the $J_{max}$ and $J_{min}$ of outermost shell from the source GBD and the $J_{max}$ and $J_{min}$ of the shell from the destination GBD, a (temporary) piecewise linear lightness mapping is constructed that maps one lightness range onto the other, and also maps the mid-points from one to the other. This is the same identical construction used in the section "Constructing an Inner Shell". Using this piecewise linear map, $J_{max}$'s and $J_{min}$'s are induced onto the destination GBD from the $J_{max}$'s and $J_{min}$'s of the innermost and middle shell of the source GBD. An induced shell is then constructed from each pair of $J_{max}/J_{min}$ using the same technique detailed in the section "Constructing an Inner Shell".

[Case: Source GBD Has 3 Shells, Destination GBD Has 2 Shells]

There is ambiguity in assigning the correspondence of the shells in this case. This is a decision that can only be made when the application is known. Namely, we could set up a correspondence as:

Source outer shell→Destination outer shell

Source inner shell→Destination inner shell or:

Source outer shell→Destination outer shell

Source middle shell→Destination inner shell

Once the decision is made, an induced shell is constructed for the destination GBD accordingly.

In the first scenario, a middle shell is constructed for the destination GBD. Again, the first step is to construct a (temporary) piecewise linear lightness map that respects the assignment of shells. The map can optionally include the mid-point as an anchor point. Once the map is established, the $J_{max}$ and $J_{min}$ of the middle shell for source GBD will induce a pair of $J_{max}/J_{min}$ in the destination. The induced middle shell will need to connect these 2 points. The construction detailed in section "Constructing an Outer Shell" can be used to achieve this. The construction described there constructs a hue slice between 2 known ones that satisfies the boundary conditions imposed by a pair of $J_{max}/J_{min}$.

In the second scenario, the destination (given) inner shell becomes the middle shell, and an inner shell is constructed inside this shell. A piecewise linear lightness map will be established first that respects the given shells and assignment. This map, together with the $J_{max}$ and $J_{min}$ of the inner shell of the source GBD, will then induce the $J_{max}$ and $J_{min}$ for the to-be-constructed inner shell in the destination GBD. These are the boundary conditions for the endpoints for the shell. Using these boundary conditions, a hue slice interior to the destination middle shell is constructed using the construction described in section "Constructing an Inner Shell".

Other decisions as to how to assign source and destination shells can be made, along with other combinations of number of shells in the source and destination GBD. The 2 special cases outlined above should however provide enough clues and details on how to proceed in the general case.

Although the invention has been described with particular illustrative embodiments, the invention is not limited to the above-described embodiments and various changes and modification may be made by those of ordinary skill in the art without departing from the spirit and scope of the invention.

What is claimed is:

1. A computerized method of gamut mapping of color values for a first device into counterpart color values for a second device, comprising:

accessing an inner shell and an outer shell of a multi-shelled gamut boundary descriptor (GBD) for the second device, and determining an amount by which the inner shell of the second device is smaller than the outer shell of the second device;

using a computer to construct the inner shell for the first device by reducing an outer shell of the first device based at least in part on the amount by which the inner shell of the second device is smaller than the outer shell of the second device; and performing gamut mapping of color values by using the constructed inner shell and the outer shell for the first device, and by using the inner shell and the outer shell of the multi-shelled GBD for the second device.

2. A method according to claim 1, wherein the amount by which the inner shell of the second device is smaller than the outer shell of the second device is determined by obtaining a ratio of the inner shell of the second device relative to the outer shell of the second device, and wherein the inner shell for the first device is reduced based at least in part on the ratio.

3. A method according to claim 1, wherein the amount by which the inner shell of the second device is smaller than the outer shell of the second device is determined at multiple locations for the multi-shell GBD, and wherein the outer shell of the first device is reduced at each corresponding location by the amount determined for that location.

4. A method according to claim 1, wherein the inner shell for the first device is constructed for a hue slice of the multi-shell GBD.

5. A method according to claim 4, further comprising the step of identifying a point on the neutral axis whose lightness is the same as that of a cusp of the outer shell of the second device, wherein a determination is made of the amount by which the inner shell of the second device is smaller than the outer shell of the second device for each of plural rays emanating from the identified point, and wherein the outer shell of the first device is reduced based at least in part on the determined amount at each corresponding ray.

6. A method according to claim 5, wherein the amount by which the inner shell of the second device is smaller than the outer shell of the second device is determined by obtaining a ratio of the inner shell of the second device to the outer shell of the second device at each of said plural rays.

7. An apparatus for gamut mapping of color values for a first device into counterpart color values for a second device, said apparatus comprising:
- memory for storing computer-executable process steps; and
- a processor for executing the process steps stored in memory, wherein the process steps executed by the processor comprise:
- an accessing step to access an inner shell and an outer shell of a multi-shelled gamut boundary descriptor (GBD) for the second device, and determining an amount by which the inner shell of the second device is smaller than the outer shell of the second device;
- a constructing step to construct the inner shell for the first device by reducing an outer shell of the first device based at least in part on the amount by which the inner shell of the second device is smaller than the outer shell of the second device; and
- a performing step to perform gamut mapping of color values by using the constructed inner shell and the outer shell for the first device, and by using the inner shell and the outer shell of a multi-shelled GBD for the second device.

8. An apparatus according to claim 7, wherein the amount by which the inner shell of the second device is smaller than the outer shell of the second device is determined by obtaining a ratio of the inner shell of the second device relative to the outer shell of the second device, and wherein the inner shell for the first device is reduced based at least in part on the ratio.

9. An apparatus according to claim 7, wherein the amount by which the inner shell of the second device is smaller than the outer shell of the second device is determined at multiple locations for the multi-shell GBD, and wherein the outer shell of the first device is reduced at each corresponding location by the amount determined for that location.

10. An apparatus according to claim 7, wherein the inner shell for the first device is constructed for a hue slice of the multi-shell GBD.

11. An apparatus according to claim 10, further comprising an identifying step to identify a point on the neutral axis whose lightness is the same as that of a cusp of the outer shell of the second device, wherein a determination is made of the amount by which the inner shell of the second device is smaller than the outer shell of the second device for each of plural rays emanating from the identified point, and wherein the outer shell of the first device is reduced based at least in part on the determined amount at each corresponding ray.

12. An apparatus according to claim 11, wherein the amount by which the inner shell of the second device is smaller than the outer shell of the second device is determined by obtaining a ratio of the inner shell of the second device to the outer shell of the second device at each of said plural rays.

13. Computer-readable memory medium having computer-executable process steps stored thereon for causing a computer to gamut map color values for a first device into counterpart color values for a second device, wherein said process steps comprise:
- an accessing step to access an inner shell and an outer shell of a multi-shelled gamut boundary descriptor (GBD) for the second device, and to determine an amount by which the inner shell of the second device is smaller than the outer shell of the second device;
- a constructing step to construct the inner shell for the first device by reducing an outer shell of the first device based at least in part on the amount by which the inner shell of the second device is smaller than the outer shell of the second device; and
- a performing step to perform gamut mapping of color values by using the constructed inner shell and the outer shell for the first device, and by using the inner shell and the outer shell of a multi-shelled GBD for the second device.

14. Computer-executable process steps stored on a computer-readable medium for causing a computer to gamut map color values for a first device into counterpart color values for a second device, wherein the computer-executable process steps comprise:
- code for accessing an inner shell and an outer shell of a multi-shelled gamut boundary descriptor (GBD) for the second device, and for determining an amount by which the inner shell of the second device is smaller than the outer shell of the second device;
- code for constructing the inner shell for the first device by reducing the outer shell of the first device based at least in part on the amount by which the inner shell of the second device is smaller than the outer shell of the second device; and
- code for performing gamut mapping of color values by using the constructed inner shell and the outer shell for the first device, and by using the inner shell and the outer shell of a multi-shelled GBD for the second device.

15. A color management module for transforming a first color value in a first device dependent coordinate system to a counterpart second color value in a second device dependent coordinate system, said color management module comprising:
- a first transformation of the first color value to a first color value in a device independent color coordinate system;
- a second transformation of the first color value in the device independent coordinate system to a first color value in a perceptual color coordinate system;
- a gamut mapping so as to map the first color value in the perceptual color coordinate system to a second color value in the perceptual color coordinate system;
- a third transformation of the second color value in the perceptual color coordinate system to a second color value in the device independent color coordinate system;
- a fourth transformation of the second color value in the device independent color coordinate system to the second color value in the destination device dependent color coordinate system;
- wherein said gamut mapping step is performed according to any one of claims 1 to 6.

* * * * *